United States Patent
Ueno et al.

(10) Patent No.: US 10,668,906 B2
(45) Date of Patent: Jun. 2, 2020

(54) BRAKE CONTROL DEVICE

(71) Applicant: CENTRAL JAPAN RAILWAY COMPANY, Nagoya-shi, Aichi (JP)

(72) Inventors: Masayuki Ueno, Nagoya (JP); Gakuji Kobayashi, Nagoya (JP)

(73) Assignee: CENTRAL JAPAN RAILWAY COMPANY, Nagoya-shi (JP)

( * ) Notice: Subject to any disclaimer, the term of this patent is extended or adjusted under 35 U.S.C. 154(b) by 39 days.

(21) Appl. No.: 15/959,154

(22) Filed: Apr. 20, 2018

(65) Prior Publication Data

US 2018/0326954 A1    Nov. 15, 2018

(30) Foreign Application Priority Data

May 9, 2017    (JP) .................................. 2017-092915

(51) Int. Cl.
*B60T 8/17* (2006.01)
*B60T 8/1761* (2006.01)
*B60T 8/171* (2006.01)

(52) U.S. Cl.
CPC ............ *B60T 8/1761* (2013.01); *B60T 8/171* (2013.01); *B60T 8/1705* (2013.01)

(58) Field of Classification Search
CPC ....... B60T 8/1761; B60T 8/1705; B60T 8/171
See application file for complete search history.

(56) References Cited

FOREIGN PATENT DOCUMENTS

| DE | 102010049303 A1 | * | 4/2013 | ............ B60T 8/1705 |
| JP | 2006014543 A | | 1/2006 | |
| WO | WO-2016136216 A1 | * | 9/2016 | .............. B60L 3/106 |

* cited by examiner

*Primary Examiner* — Melanie Torres Williams
(74) *Attorney, Agent, or Firm* — Ferguson Case Orr Paterson

(57) ABSTRACT

Provided is a brake control device that enables shortening of a braking distance in an emergency stop situation, according to an adhesive state of a wheel. The present disclosure relates to a brake control device for emergency stopping of a railway vehicle. The brake control device includes at least one brake unit, a brake controller, and at least one skidding detector. The at least one brake unit generates a braking force. The brake controller is configured to control operation of the at least one brake unit. The brake controller changes a braking pattern to be output to the at least one brake unit based on skidding information of a wheel. The at least one skidding detector is configured to obtain the skidding information.

8 Claims, 3 Drawing Sheets

BRAKE CONTROL DEVICE

CROSS-REFERENCE TO RELATED APPLICATIONS

This application claims the benefit of Japanese Patent Application No. 2017-092915 filed on May 9, 2017 with the Japan Patent Office, the entire disclosure of which is incorporated herein by reference.

BACKGROUND

The present disclosure relates to a brake control device.

A railway vehicle comprises an emergency brake that stops the railway vehicle in an emergency. The emergency brake is required to minimize a braking distance needed until the railway vehicle stops. However, in the brake for a railway vehicle, if a braking force is simply increased, a skidding state occurs in which wheels skid with respect to a track. Thus, such increase in the braking force may end up increasing the braking distance on the contrary, as well as causing the risk of damaging the wheels.

Therefore, Japanese Unexamined Patent Application Publication No. 2006-14543 has proposed a method for ensuring deceleration as an entire composition of a railway vehicle by reducing a braking force of a skidding car among multiple cars composing the railway vehicle, and by compensating a braking force as a whole using the braking force of the other cars.

SUMMARY

An adhesive state of the wheel varies depending on the weather, the temperature, a state of the track, disturbance such as vibrations, and so on, and also differs according to a distance from the first car. Thus, in the method disclosed in the aforementioned publication, when a state of adhesion between the wheel and the track is extremely poor or in other cases, compensation of the braking force by the other cars may facilitate skidding, resulting in the risk of increasing the braking distance on the contrary.

In one aspect of the present disclosure, it is desirable to provide a brake control device that enables shortening of a braking distance in an emergency stop situation, according to an adhesive state of a wheel.

One aspect of the present disclosure is a brake control device for emergency stopping of a railway vehicle. The brake control device comprises at least one brake unit, a brake controller, and at least one skidding detector. The at least one brake unit generates a braking force. The brake controller is configured to control operation of the at least one brake unit. The brake controller changes a braking pattern to be output to the at least one brake unit based on skidding information of a wheel. The at least one skidding detector is configured to obtain the skidding information.

Such a configuration makes it possible to optimally change the braking pattern in an emergency according to the skidding information, that is, an adhesive state of the wheel. Thus, it is possible to optimize the control in which, for example, the braking force is increased when minor skidding is occurring and in which the braking force is decreased when major skidding is occurring. As a result, a braking distance in an emergency stop situation can be shortened.

In one aspect of the present disclosure, the brake controller may make a determination of changing the braking pattern based on a skidding shaft deceleration, a skidding speed difference, a number of repetitions of skidding, a skidding duration, or a combination thereof. Such a configuration makes it possible to optimize choice of the braking pattern more.

In one aspect of the present disclosure, the brake controller may make a determination of changing the braking pattern based on a combination of the skidding shaft deceleration or the skidding speed difference with at least one of the number of repetitions of skidding or the skidding duration.

In one aspect of the present disclosure, the railway vehicle may be composed of multiple cars. The brake controller may be provided to each car. The brake controller may determine the braking pattern for each car based on the skidding information of the car. Such a configuration makes it possible to perform a brake control according to an adhesive state of each car.

BRIEF DESCRIPTION OF THE DRAWINGS

Example embodiments of the present disclosure will be described below with reference to the accompanying drawings, in which.

DETAILED DESCRIPTION OF THE PREFERRED EMBODIMENTS

1. First Embodiment

[1-1. Configuration]

Figure 1:
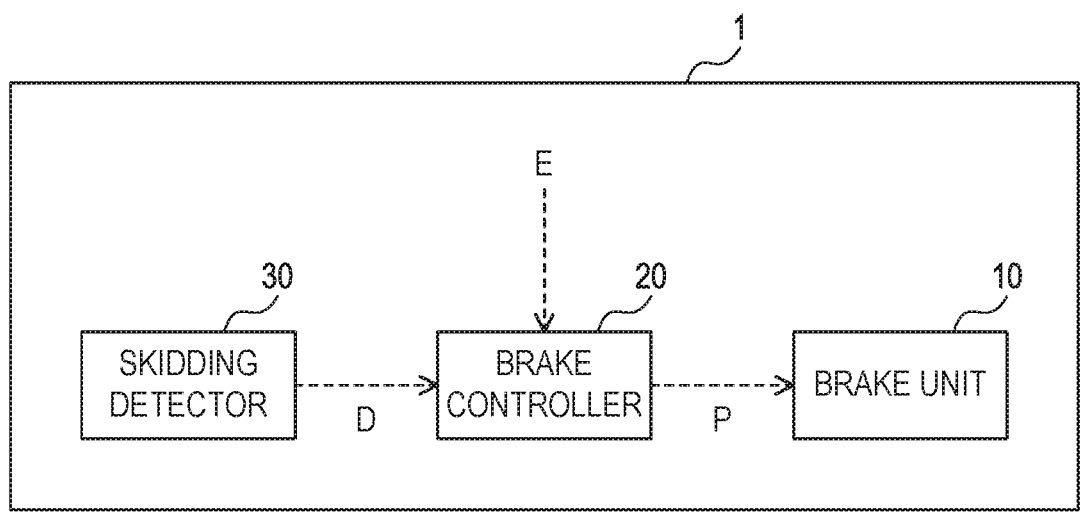
FIG. 1 is a block diagram schematically showing a configuration of a brake control device of a first embodiment.

A brake control device 1 shown in FIG. 1 is an emergency brake control device provided to a railway vehicle and brings the railway vehicle to an emergency stop. The brake control device 1 comprises a brake unit 10 that generates a braking force (stopping force), a brake controller 20 that controls operation of the brake unit 10, and a skidding detector 30 that obtains skidding information of wheels of the railway vehicle.

Here, "emergency brake" means a brake to stop the railway vehicle as quickly as possible in an emergency, that is, when an unexpected accident has occurred. Such an emergency brake is designed with consideration of shortening of a braking distance (stopping distance), thus generally having a shorter braking distance than usual brakes. Specific examples of the emergency include occurrence of an earthquake, failure of a regular brake, failure of a protective device, a case of manual operation by a crew, and so on.

The brake unit 10, the brake controller 20, and the skidding detector 30 of the brake control device 1 are provided to each car. That means, in the present embodiment, a braking pattern P is decided for each car based on skidding information D of the car. The railway vehicle to which the brake unit of the present disclosure is mounted may be composed of a single car but is generally composed of multiple cars.

<Brake Unit>

The brake unit 10 applies the braking force to the wheel of the railway vehicle to thereby reduce a shaft speed of the wheel. A type of the brake unit 10 is not limited in particular.

The brake unit 10 may be a mechanical brake or a regenerative brake and may be a combination thereof. In the case of the mechanical brake, a type thereof (e.g., a wheel tread brake, a disc brake, and so on) is also not limited.

The brake unit 10 is configured to be able to adjust the braking force applied to the wheel according to the braking pattern P output from the brake controller 20. The brake unit 10 is generally provided to each wheel of the car.

<Brake Controller>

The brake controller 20 outputs the braking pattern P to the brake unit 10 to thereby control operation of the brake unit 10. The brake controller 20 performs an emergency braking process, which will be described below, when an emergency brake command E is input thereto.

The braking pattern P is output to the brake unit 10 as a command current and so on if the brake unit 10 comprises a mechanical brake, and as a command voltage and so on if the brake unit 10 comprises a regenerative brake.

The brake controller 20 changes the braking pattern P to be output to the brake unit 10 using a skidding indicator based on the skidding information D transmitted from the skidding detector 30. Transmitted to the brake controller 20 is not only the skidding information D transmitted from the skidding detector 30 but also additional data from an air spring pressure sensor and so on. These data may be used for control of the emergency brake in combination with the skidding information D.

The skidding indicator based on the skidding information D is not limited as long as it serves as an indicator for choosing the braking pattern P according to a skidding state of the wheel. Among such indicators, skidding shaft deceleration, skidding speed difference, the number of repetitions of skidding, and a skidding duration are suitable as the skidding indicator. These serve as indicators of presence/absence of skidding and the degree of skidding. Among these, the skidding shaft deceleration is preferred. Further, combination of the skidding shaft deceleration or the skidding speed difference with at least one of the number of repetitions of skidding or the skidding duration is also preferred. Instead of the skidding speed difference, a "skidding rate", which is a rough synonym therefor, may be used. Each indicator will be described below.

(Skidding Shaft Deceleration)

In a relatively large-scale skidding, the skidding shaft deceleration is proportional to a difference between a braking force of a wheel shaft and an adhesive power.

Thus, the skidding shaft deceleration $\beta_{skid}$[km/h/s] of each wheel shaft is obtained by the following formula (1).

$$I \cdot \beta_{skid} = k(F_B - F_{MAX}) \quad (1)$$

In the above formula (1), I refers to the moment of inertia [kg·m²] of one wheel shaft, k refers to a coefficient, $F_B$ refers to a braking force [N] of this wheel shaft, and $F_{MAX}$ refers to an adhesive power [N] represented by the following formula (2).

$$F_{MAX} = f(\mu, V) \quad (2)$$

In the above formula (2), μ refers to an adhesive coefficient, and V refers to the car velocity.

Among the above variables, the moment of inertia I of the wheel shaft and the adhesive power $F_{MAX}$ are already known. Thus, the skidding shaft deceleration $\beta_{skid}$ can be calculated based on the braking force $F_B$. The skidding shaft deceleration can be considered to be an indicator similar to the adhesive coefficient of the wheel shaft.

(Skidding Speed Difference)

The skidding speed difference is a difference between a speed of a skidding wheel and the car velocity. Here, the car velocity is a value obtained by converting a rotational speed of the wheel shaft rotating fastest into a traveling speed. What is obtained by dividing the skidding speed difference by the car velocity is the skidding rate. Use of the skidding speed difference or the skidding rate as the indicator makes it possible to perform a control to reduce skidding by adjusting a shaft deceleration to between the lower limit of deceleration of the skidding shaft and deceleration of an adhesive shaft (i.e., a non-skidding shaft).

(Number of Repetitions of Skidding)

The number of repetitions of skidding is the number of changeovers between a skidding state and an adhesive state (i.e., a state in which no skidding is detected) in a specified period of time. A state in which skidding and re-adhesion are repeated in a short period of time is potentially determined to be a continued adhesive state, but actually is a state in which the braking force is less likely to be transmitted. Thus, an accurate brake control can be performed by using the number of repetitions of skidding as the indicator.

The number of repetitions of skidding can be used alone as the indicator; however, if used as an indicator combined especially with the skidding shaft deceleration or the skidding speed difference, effective reduction of skidding can be accomplished.

(Skidding Duration)

The skidding duration is a total sum of the times when skidding is occurring (i.e., when skidding is being detected) regardless of the degree of adhesion. Reduction of skidding can be promoted using the skidding duration.

The skidding duration can be used alone as the indicator; however, if used as an indicator combined especially with the skidding shaft deceleration or the skidding speed difference, effective reduction of skidding can be accomplished.

<Skidding Detector>

The skidding detector 30 detects a skidding state of each wheel, and obtains the skidding information D. The skidding information D is output to the brake controller 20 and used for determination in changing the braking pattern P.

The skidding information D may be the aforementioned skidding indicator itself or may be a numerical value for calculating the skidding indicator. As a means for obtaining the skidding information D, a well-known sensor or the like can be used.

[1-2. Process]

The emergency braking process performed by the brake controller 20 will be described below with reference to a flow diagram of FIG. 2.

Upon input of the emergency brake command E, the brake controller 20 starts the emergency braking process. After starting the process, the brake controller 20 first outputs the braking pattern P corresponding to a default brake notch to the brake unit 10 (step S10). This results in application of a braking force to the wheel via the brake unit 10.

After outputting an initial braking pattern, the brake controller 20 performs a skidding control (step S20). In the skidding control, the brake controller 20 performs calculation of the skidding indicator and so on based on the skidding information D obtained by the skidding detector 30. Control by a conventional brake control device can be utilized in the skidding control.

Next, the brake controller 20 performs a skidding determination based on the obtained skidding indicator (step S30). In this skidding determination, the obtained skidding indicator is compared with thresholds set in advance.

First, the brake controller 20 determines whether a skidding indicator X is larger than a threshold A1 (step S40). If the skidding indicator X is larger than the threshold A1 (S40: Yes), the brake controller 20 lowers the brake notch to shift the braking pattern P in a direction in which the braking force is decreased (i.e., to a lower position) (step S50).

In contrast, if the skidding indicator X is equal to or smaller than the threshold A1 (S40: No), the brake controller 20 further determines whether the skidding indicator X is smaller than another threshold A2 (step S60). If the skidding indicator X is smaller than the threshold A2 (S60: Yes), the brake controller 20 raises the brake notch to shift the braking pattern P in a direction in which the braking force is increased (i.e., to a higher position) (step S70). If the skidding indicator X is equal to or larger than the threshold A2 (S60: No), the braking pattern P is not shifted. The threshold A2 is a value equal to or smaller than the threshold A1. Thus, in the flow diagram of FIG. 2, the braking pattern P is not changed if the skidding indicator X is equal to or larger than the threshold A2 and also equal to or smaller than the threshold A1. The shifted braking pattern P is output to the brake unit 10.

After going through step S50 or step S70, or if the skidding indicator X is equal to or larger than the threshold A2 (S60: No), the brake controller 20 determines whether the emergency brake command E has been cancelled (step S80). If the emergency brake command E has been cancelled (S80: Yes), the brake controller 20 terminates the emergency braking process. Upon termination of the emergency braking process, the brake controller 20 outputs a brake output stop signal to the brake unit 10. This results in release of the emergency brake.

In contrast, if the emergency brake command E is continuing (S80: No), the emergency braking process returns to the skidding control (S20), and the brake controller 20 repeats the process from the skidding control (S20). Such a looped process is continued until the emergency brake command E is cancelled.

Here, specific examples of the skidding indicator X and the thresholds A1 and A2 will be described. If the skidding indicator X is, for example, the skidding shaft deceleration, the threshold A1, which is an upper limit, is a numerical value set with consideration of re-adhesiveness or the like of the wheel, and upon exceedance of this numerical value, the brake notch is to be lowered. The threshold A2, which is a lower limit, can be set to, for example, a marginal deceleration allowing for determination of skidding (i.e., a threshold for detecting skidding).

Similar logic is also applicable to a case where the skidding indicator X is the skidding speed difference (the skidding rate), the number of repetitions of skidding, the skidding duration, or the like. If multiple skidding indicators are used in combination, the determination flow in the skidding determination (S30) may be a multistage one for the respective skidding indicators. Alternatively, a determination formula obtained by combining the multiple skidding indicators (e.g., the skidding indicator X1<A1 and also the skidding indicator X2>B1) may be used.

Figure 2:
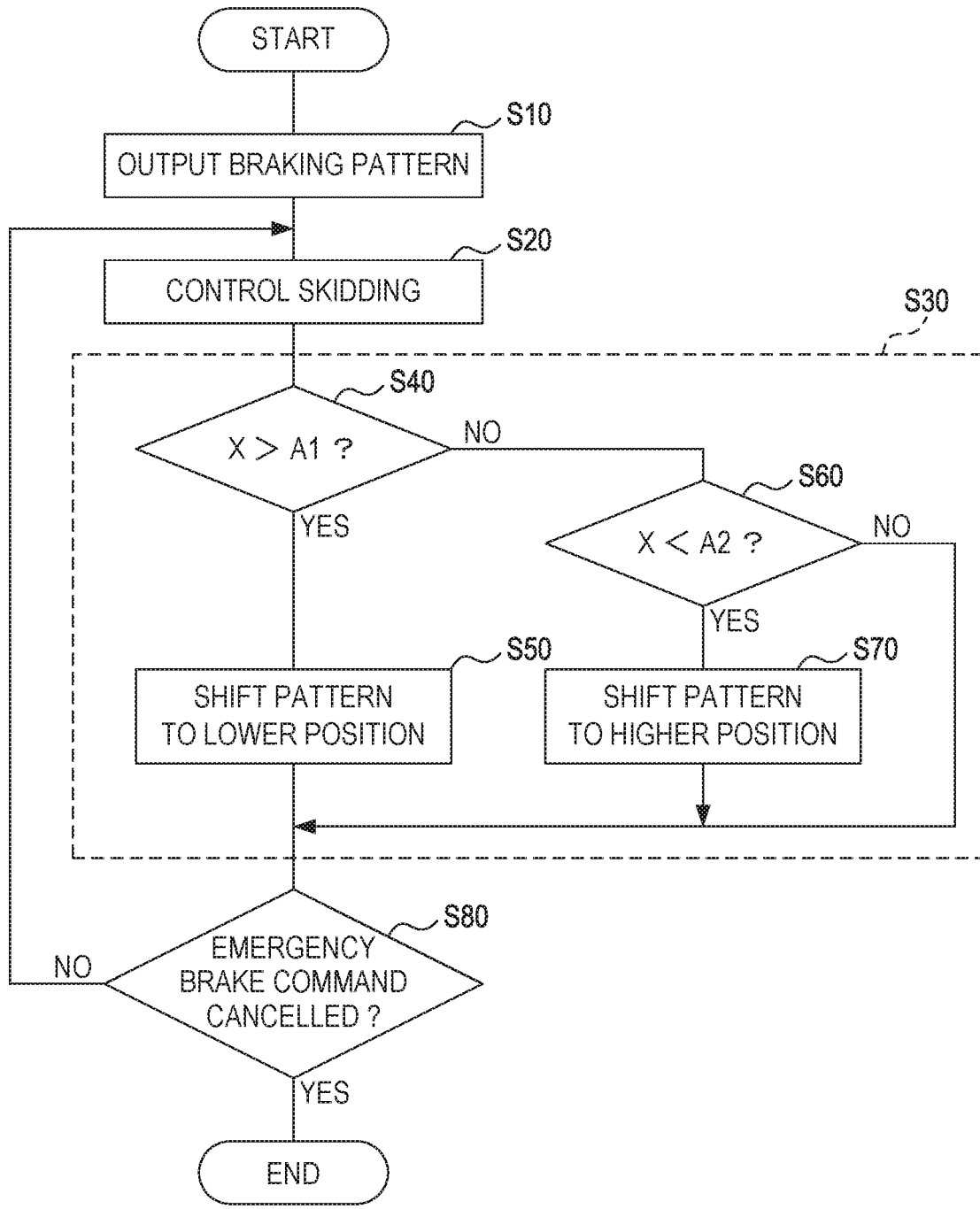
FIG. 2 is a flow diagram schematically showing a process performed by a brake controller of the brake control device of FIG. 1.

As can be understood, the flow diagram of FIG. 2 is just an example. The determination on X>A1 (S40) may be performed after the determination on X<A2 (S60), or either one of these determinations may be performed. Alternatively, as described above, change of the braking pattern P may be determined using three or more determination formulae. Alternatively, it may be possible, depending on the content of the skidding indicator X, to shift the braking pattern P in the direction in which the braking force is increased when X>A1 is satisfied, and to shift the braking pattern P in the direction in which the braking force is decreased when X<A2 is satisfied.

Alternatively, it may be possible to change the thresholds A1 and A2 as appropriate according to the current braking pattern P. In other words, a table of the thresholds A1 and A2 corresponding to the braking pattern P may be prepared. For example, it may be possible to set the value of the threshold A2 to a larger one when the braking pattern P has been shifted to a lower position, so that the braking pattern P returns to a higher position at the point of restoration of adhesiveness.

Further, it may be possible to add a condition, for example, that, after once the braking pattern P has been shifted to a lower position in the emergency braking process, the braking pattern P is allowed to be shifted only to a lower position thereafter without allowing it to return to a higher position.

[1-3. Effects]

The above-detailed embodiment can provide the following effects.

(1a) The braking pattern in an emergency can be changed optimally according to the skidding information, that is, an adhesive state of the wheel. Thus, it is possible to optimize the control in which, for example, the braking force is increased when minor skidding is occurring and in which the braking force is decreased when major skidding is occurring. Such control of the braking pattern makes it possible to increase a total braking force during the emergency braking process to thereby shorten the braking distance as compared with the conventional control.

(1b) The skidding information D used for determination in changing the braking pattern P can be detected with conventional equipment because information conventionally detected in the cars can be utilized as the skidding information D. Moreover, the skidding shaft deceleration or the like based on such skidding information D is an indicator used also in the conventional skidding control; thus, the thresholds are easy to set and highly reliable. Consequently, the brake control device 1 with a high reliability can be established at lower cost.

(1c) The brake controller 20 is provided to each car; thus, the braking pattern P can be decided for each car based on the skidding information of the car. This makes it possible to perform a brake control accurately according to the adhesive state of each car.

2. Second Embodiment

[2-1. Configuration]

Figure 3:
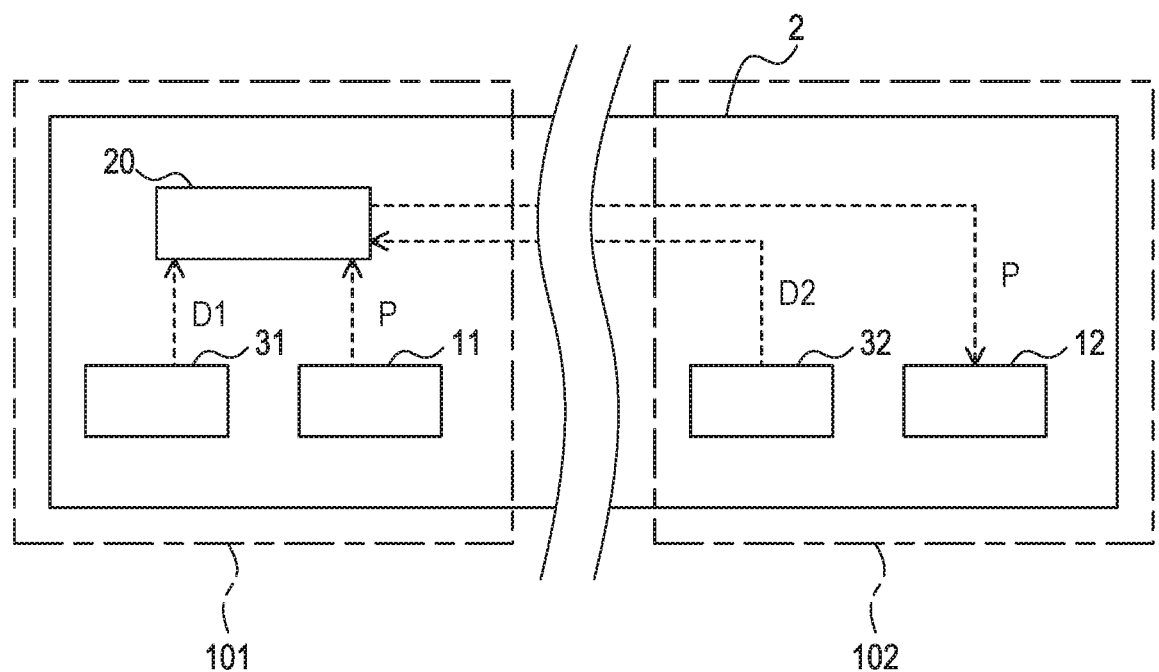
FIG. 3 is a block diagram schematically showing a configuration of a brake control device of a second embodiment.

A brake control device 2 shown in FIG. 3 is an emergency brake control device provided to a railway vehicle and brings the railway vehicle to an emergency stop. The brake control device 2 comprises brake units 11 and 12 that generate a braking force, the brake controller 20 that controls operation of the brake units 11 and 12, and skidding detectors 31 and 32 that obtain skidding information of wheels of the railway vehicle.

The brake units 11 and 12, the brake controller 20, and the skidding detectors 31 and 32 are the same as the brake unit 10, the brake controller 20, and the skidding detector 30 of FIG. 1, respectively; thus, detailed explanation is not repeated.

In the present embodiment, the respective brake units 11 and 12 and the respective skidding detectors 31 and 32 of the brake control device 2 are provided to the corresponding cars, and the brake controller 20 is provided to one of the cars. Specifically, as shown in FIG. 3, the brake unit 11, the brake controller 20, and the skidding detector 31 are arranged in a car 101, and the brake unit 12 and the skidding detector 32 are arranged in another car 102.

The brake controller 20 determines the braking pattern P for the car 101 and the braking pattern P for the car 102 based on skidding information D1 from the skidding detector 31 in the car 101 and skidding information D2 from the skidding detector 32 in the car 102, respectively. Each braking pattern P is output from the brake controller 20 to the corresponding brake unit 11 in the car 101 and to the corresponding brake unit 12 in the car 102.

FIG. 3 shows the brake control device 2 configured with two brake units, two skidding detectors, and one brake controller. However, the brake control device 2 may comprise three or more brake units and three or more skidding detectors. In other words, a railway vehicle composed of three or more cars is also a subject of the present embodiment. Furthermore, it may be possible to divide cars into groups and to provide one brake controller to each group.

[2-2. Effects]

The above-detailed embodiment can provide the following effects.

(2a) Since a brake control of an entire composition of a railway vehicle can be performed collectively by the single brake controller 20, a simply configured brake control device can be achieved, resulting in cost reduction, as compared with the case in which the brake controller 20 is provided to each car.

3. Other Embodiments

The embodiments of the present disclosure have been described so far; however, the present disclosure is not limited to the aforementioned embodiments and can take various forms.

(3a) The brake control device 1 of the aforementioned first embodiment and the brake control device 2 of the aforementioned second embodiment can be combined with each other. Specifically, it may be possible to provide the brake controller 20 to each of some cars among the cars composing a railway vehicle, and to collectively control all of the other cars with another brake controller 20, or to divide the other cars into groups and to collectively control each group of cars with another brake controller 20.

(3b) The function(s) performed by a single element in the aforementioned embodiments may be performed by multiple elements. The function(s) performed by multiple elements may be performed by a single element. Part of the configuration of the aforementioned embodiments may be omitted. At least part of the configuration of the aforementioned embodiments may be added to or replaced by the configuration of the aforementioned other embodiments. All modes included in the technical idea identified from recitations in the accompanying claims are embodiments of the present disclosure.

What is claimed is:

1. A brake control device for emergency stopping of a railway vehicle, the brake control device comprising:
at least one brake unit that generates a braking force;
a brake controller configured to control operation of the at least one brake unit; and
at least one skidding detector configured to obtain skidding information of a wheel,
wherein the brake controller changes a braking pattern to be output to the at least one brake unit based on the skidding information,
wherein the brake controller changes the braking pattern such that a braking force is decreased when a skidding indicator based on the skidding information is larger than a first threshold, and changes the braking pattern such that the braking force is increased when the skidding indicator is smaller than a second threshold,
wherein the brake controller makes a determination of changing the braking pattern based on a skidding shaft deceleration, a skidding speed difference, a number of repetitions of skidding, a skidding duration, or a combination thereof,
wherein the skidding shaft deceleration $\beta_{skid}$ [km/h/s] is obtained by the following formula (1):

$$I \cdot \beta_{skid} = k(F_B - F_{MAX})$$

where I refers to the moment of inertia [kg·m²] of a wheel shaft with the wheel, k refers to a coefficient, $F_B$ refers to a braking force [N] of the wheel shaft, and $F_{MAX}$ refers to an adhesive power [N] represented by the following formula (2):

$$F_{MAX} = f(\mu, V),$$

where $\mu$ refers to an adhesive coefficient, and V refers to a car velocity,
wherein the skidding speed difference is a difference between a speed of the wheel and the car velocity,
wherein the number of repetitions of skidding is the number of changeovers of the wheel between a skidding state and an adhesive state in a specified period of time, and
wherein the skidding duration is a total sum of the times when skidding is occurring on the wheel.

2. The brake control device according to claim 1, wherein the brake controller makes a determination of changing the braking pattern based on a skidding shaft deceleration, a skidding speed difference, a number of repetitions of skidding, a skidding duration, or a combination thereof.

3. The brake control device according to claim 2, wherein the brake controller makes a determination of changing the braking pattern based on a combination of the skidding shaft deceleration or the skidding speed difference with at least one of the number of repetitions of skidding or the skidding duration.

4. The brake control device according to claim 1, wherein the railway vehicle is composed of multiple cars, and
wherein the brake controller is provided to each car, and determines the braking pattern for each car based on the skidding information of the car.

5. The brake control device according to claim 1, wherein the brake controller makes a determination of changing the braking pattern based on the number of repetitions of skidding, the skidding duration, or a combination thereof.

6. A brake control device for emergency stopping of a railway vehicle, the brake control device comprising:
at least one brake unit that generates a braking force;
a brake controller configured to control operation of the at least one brake unit; and
at least one skidding detector configured to obtain skidding information of a wheel,
wherein the brake controller changes a braking pattern to be output to the at least one brake unit based on the skidding information,
wherein the brake controller makes a determination of changing the braking pattern based on a skidding shaft deceleration, a skidding speed difference, a number of repetitions of skidding, a skidding duration, or a combination thereof, wherein the skidding shaft deceleration $\beta_{skid}$ [km/h/s] is obtained by the following formula (1):

$$I \cdot \beta_{skid} = k(F_B - F_{MAX}),$$

where I refers to the moment of inertia [kg·m²] of a wheel shaft with the wheel, k refers to a coefficient, $F_B$ refers to a braking force [N] of the wheel shaft, and $F_{MAX}$ refers to an adhesive power [N] represented by the following formula (2):

$$F_{MAX} = f(\mu, V),$$

where μ refers to an adhesive coefficient, and V refers to a car velocity, wherein the skidding speed difference is a difference between a speed of the wheel and the car velocity, wherein the number of repetitions of skidding is the number of changeovers of the wheel between a skidding state and an adhesive state in a specified period of time, and wherein the skidding duration is a total sum of the times when skidding is occurring on the wheel.

7. The brake control device according to claim 6, wherein the brake controller changes the braking pattern such that a braking force is decreased when a skidding indicator based on the skidding information is larger than a first threshold, and changes the braking pattern such that the braking force is increased when the skidding indicator is smaller than a second threshold.

8. The brake control device according to claim 6, wherein the brake controller makes a determination of changing the braking pattern based on the number of repetitions of skidding, the skidding duration, or a combination thereof.

* * * * *